United States Patent [19]

Tsunokawa et al.

[11] Patent Number: 5,546,446
[45] Date of Patent: Aug. 13, 1996

[54] PUBLIC TELEPHONE SYSTEM USING A PREPAID CARD TO ENABLE COMMUNICATION

[75] Inventors: Keiichi Tsunokawa; Nobuo Suzuki, both of Tokyo, Japan

[73] Assignee: Tamura Electric Works, Ltd., Tokyo, Japan

[21] Appl. No.: 326,280

[22] Filed: Oct. 20, 1994

[30] Foreign Application Priority Data

Oct. 21, 1993 [JP] Japan .................................. 5-285563

[51] Int. Cl.$^6$ .......................... H04M 15/00; H04M 17/00
[52] U.S. Cl. .......................... 379/114; 379/130; 379/144
[58] Field of Search ............................ 379/91, 114, 121, 379/130, 144; 235/380–342.5; 340/825.34, 825.35

[56] References Cited

U.S. PATENT DOCUMENTS

| | | | |
|---|---|---|---|
| 4,706,275 | 11/1987 | Kamil | 379/144 |
| 4,879,744 | 11/1989 | Tasaki et al. | 379/144 |
| 4,975,942 | 12/1990 | Zebryk | 379/91 X |
| 5,265,155 | 11/1993 | Castro | 379/144 X |
| 5,359,182 | 10/1994 | Schilling | 379/144 X |

FOREIGN PATENT DOCUMENTS 3-160591  7/1991  Japan .

*Primary Examiner*—Stephen Chin
*Assistant Examiner*—Paul Loomis
*Attorney, Agent, or Firm*—Blakely, Sokoloff, Taylor & Zafman

[57] ABSTRACT

A public telephone system includes a plurality of public telephone sets and a center apparatus. Each of the public telephone sets includes a reading unit for reading card information recorded in a prepaid card upon insertion of the prepaid card and a first transmitting unit for transmitting the card information read by the reading unit to the center apparatus through a telephone line. The center apparatus includes a database for storing the card information of the prepaid card for each issued card, a collating unit for collating the card information stored in the database with the card information from the first transmitting unit upon insertion of the prepaid card into each public telephone set and allowing speech communication using the prepaid card on the basis of a collation result, a keyboard for setting data for designating a valid period of the prepaid card, and a deleting unit for deleting the card information related to the prepaid card which is expired in the database when the data for designating the valid period of the prepaid card is set by the keyboard.

9 Claims, 6 Drawing Sheets

PUBLIC TELEPHONE SYSTEM USING A PREPAID CARD TO ENABLE COMMUNICATION

BACKGROUND OF THE INVENTION

The present invention relates to a public telephone system constituted by a public telephone set for performing speech communication using a prepaid card, a center apparatus for managing the prepaid card used in the public telephone set, and the like.

In a card public telephone set, speech communication can be performed using a prepaid card (to be referred to as a card hereinafter) storing prepaid value information. When a card is inserted into a telephone set of this type, a call rate as valid information is read from the inserted card, and at the same time, a speech communication time according to the readout call rate is allowed. More specifically, during speech communication after insertion of the card, the call rate is decreased one by one in accordance with an autonomous charge output, i.e., a periodic output from a charge timer incorporated in the public telephone set, which sets a charge time on the basis of an input dial number, or a charge signal detection output which is periodically transmitted to a speech communication line. Upon completion of speech communication, a remaining call rate is recorded in the inserted card, and the card is ejected from the public telephone set.

To prevent illegal use of a card in such a public telephone set, card information including the serial number and the currently used call rate of a card is transmitted to a center apparatus called a card validation system upon completion of speech communication. Upon reception of the card information, the center apparatus retrieves the card and its balance corresponding to the serial number registered in a database in advance. A currently used call rate is subtracted from the card balance, and the result is registered in the database. If the balance obtained by subtracting the currently used call rate from the card balance becomes negative, the card is determined as an illegally used card and registered in a black list, and subsequent use is inhibited.

As described above, the center apparatus for managing cards used in public telephone sets cannot cancel registration of a card which is issued and registered in the database until the call rate becomes zero. In addition, the number of issued cards increases every year, so registration becomes impossible in the future regardless of an increase in memory capacity of the database. For this reason, an appropriate memory capacity cannot be determined. Furthermore, along with an increase in number of registered cards, much time is required for retrieval of a corresponding card.

SUMMARY OF THE INVENTION

It is an object of the present invention to provide a public telephone system for easily determining the memory capacity of a database used for card management in the public telephone system.

It is another object of the present invention to provide a public telephone system for performing retrieval of a card registered in a database in a short period of time.

In order to achieve the above objects, according to the present invention, there is provided a public telephone system comprising a plurality of public telephone sets for allowing speech communication upon insertion of a prepaid card, the prepaid card storing card information including an identification number, value information, and an issue date, and a center apparatus for determining whether speech communication is possible upon reception of information from the public telephone sets through a telephone line before start of speech communication by the prepaid card, each of the public telephone sets comprising reading means for reading the card information recorded in the prepaid card upon insertion of the prepaid card, and first transmitting means for transmitting the card information read by the reading means to the center apparatus through the telephone line, and the center apparatus comprising a database for storing the card information of the prepaid card for each issue, collating means for collating the card information stored in the database with the card information from the first transmitting means upon insertion of the prepaid card into each public telephone set and allowing speech communication using the prepaid card on the basis of a collation result, setting means for setting data for designating a valid period of the prepaid card, and deleting means for deleting the card information related to the prepaid card which is expired in the database when the data for designating the valid period of the prepaid card is set by the setting means.

DESCRIPTION OF THE PREFERRED EMBODIMENT

The present invention will be described below with reference to the accompanying drawings.

Figure 1:
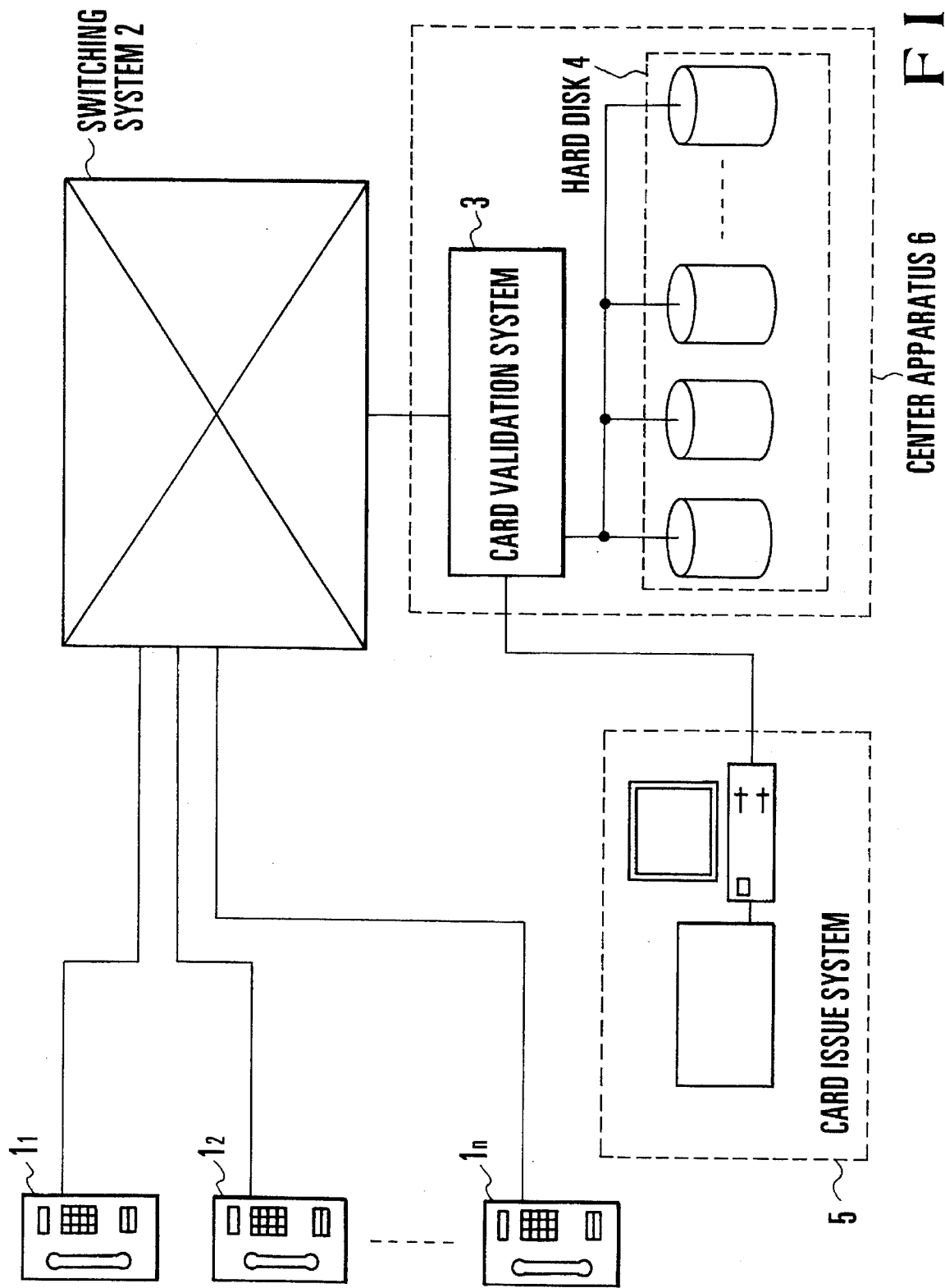
FIG. 1 is a block diagram showing a public telephone system according to an embodiment of the present invention.

FIG. 1 shows a public telephone system according to an embodiment of the present invention. Referring to FIG. 1, reference numerals $1_1$ to $1_n$ denote public telephone sets; 2, a switching system connected to the public telephone sets $1_1$ to $1_n$; 3, a card validation system for performing card management including validation of cards used in the public telephone sets; 4, a hard disk serving as a database connected to the card validation system; 6, a center apparatus constituted by the card validation system 3 and the hard disk 4; and 5, a card issue system for issuing a prepaid card storing prepaid value information and used in the public telephone sets $1_1$ to $1_n$.

Figure 2:
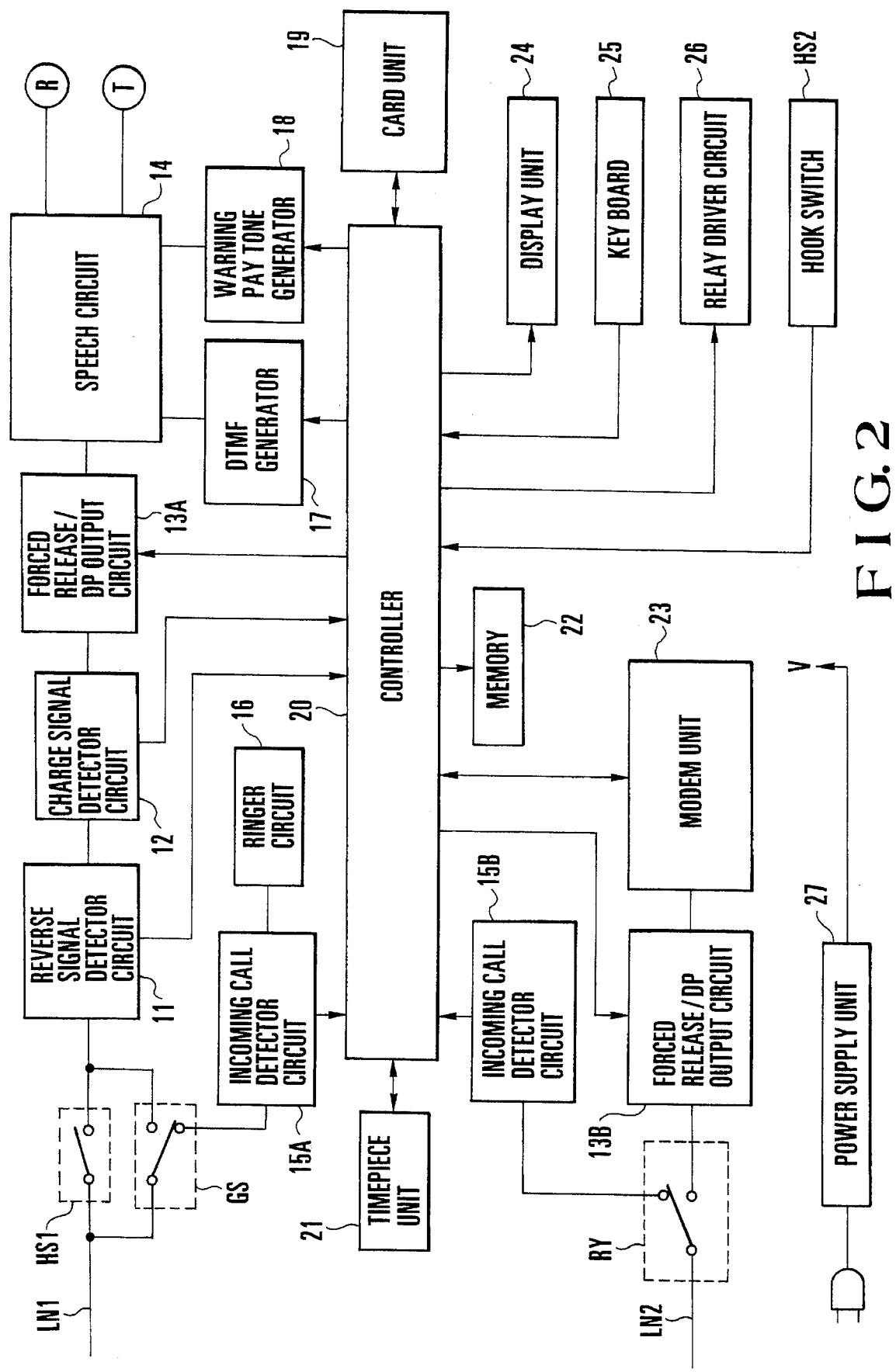
FIG. 2 is a block diagram showing a public telephone set constituting the public telephone system shown in FIG. 1.

FIG. 2 shows the arrangement of each of the public telephone sets $1_1$ to $1_n$ constituting the public telephone system. Referring to FIG. 2, reference symbol LN1 denotes a public telephone line; and LN2, a leased telephone line. Reference numeral 11 denotes a reverse signal detector circuit for detecting a reverse signal representing the response of a partner to the public telephone line LN1; 12, a charge signal detector circuit for detecting a charge signal which is periodically transmitted to the public telephone line LN1; 13A and 13B, forced release/DP output circuits for forcibly releasing the DC loops of the public line LN1 and the leased line LN2, respectively, and at the same time outputting DP (dial pulse) signals to the corresponding lines; 14, a speech circuit connected to a transmitter T and a receiver R; and 15A and 15B, incoming call detector circuits for detecting incoming call signals to the public telephone line LN1 and the leased telephone line LN2, respectively.

Reference numeral 16 denotes a ringer circuit for performing ringing in accordance with an incoming call signal to the public telephone line LN1; 17, a DTMF generator for generating a DTMF (Dual Tone Multi Frequency) signal which is outputted to the public telephone line LN1 through the speech circuit 14; 18, a warning pay tone generator for generating a warning pay tone for a user when the remaining call rate of a card becomes zero during speech communication; 19, a card unit for performing conveyance of the inserted card or recording/reproducing processing of the call rate; and 20, a controller for performing various control including speech communication control of the public telephone set and charge control. Reference numeral 21 denotes a timepiece unit for counting a calendar consisting of dates; 22, a memory for storing black list information in which the serial number of an illegal card is registered and valid period information of a card; 23, a modem unit for transmitting/receiving the card information to/from the center apparatus 6 through the leased line LN2; 24, a display unit for displaying the call rate read from the card; 25, a keyboard including dial keys for performing dial input; 26, a relay driver circuit for driving a speech communication control relay GA and a switching relay RY, both of which have contacts; and 27, a power supply unit for applying a power supply voltage to the public telephone sets. Reference symbols HS1 and HS2 denote hook switches.

The contact of the speech communication control relay GA switches the public telephone line LN1 from the illustrated state to the speech circuit 14 side on the basis of an off-hook output from the hook switch HS2 according to a call originating operation and an incoming call detection output from the incoming call detector circuit 15A according to an incoming call operation. This contact is restored in accordance with completion of the call originating or incoming operation to the public telephone line LN1. The contact of the switching relay RY switches the leased line LN2 connected to the center apparatus 6 from the illustrated state to the modem 23 side in accordance with a command from the controller 20 according to a call originating operation and a detection output from the incoming call detector circuit 15B according to an incoming call operation.

Figure 3:
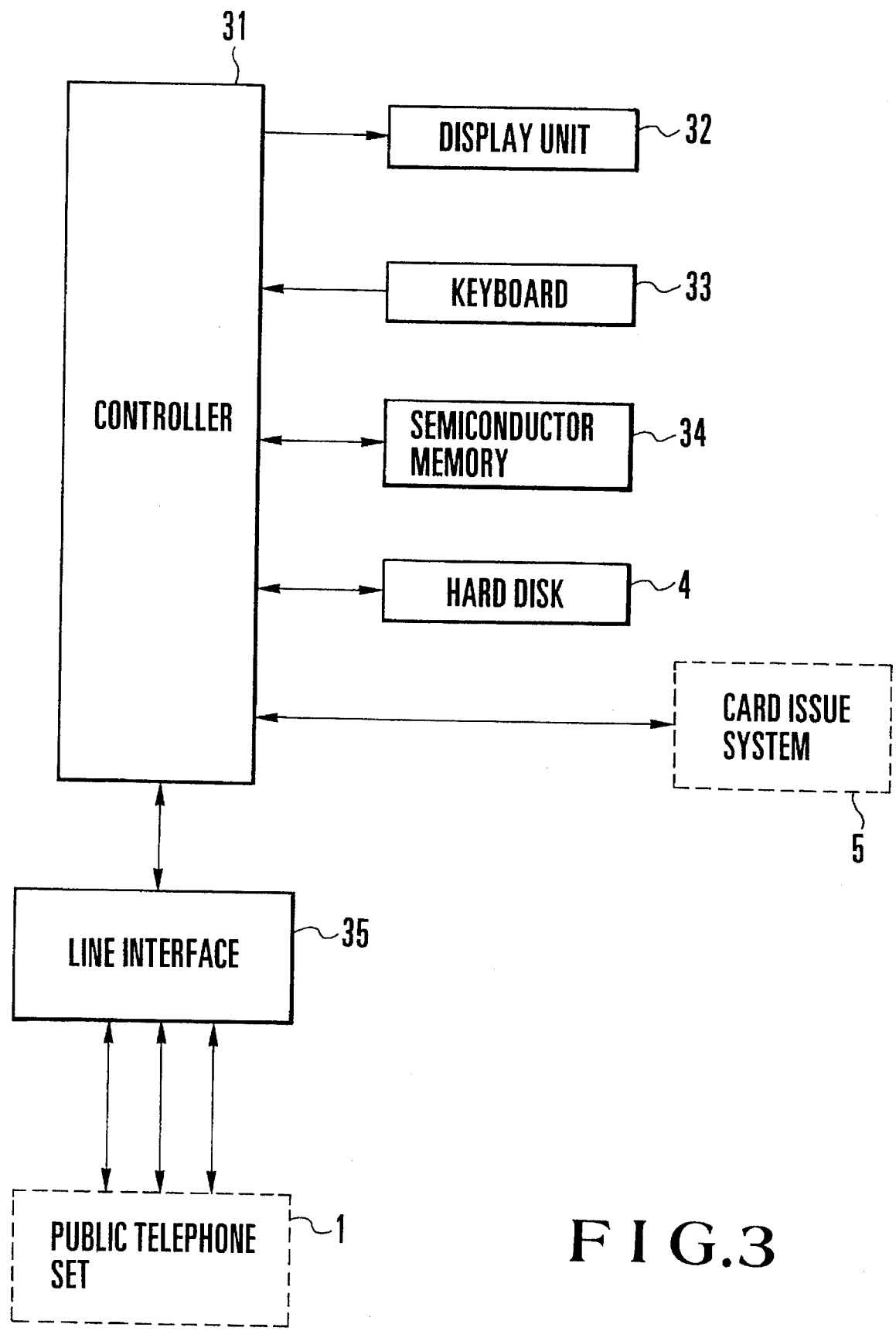
FIG. 3 is a block diagram showing a center apparatus constituting the public telephone system shown in FIG. 1.

The card validation system 3 of the center apparatus 6 constituting the public telephone system is constituted by a controller 31 for performing transmission/reception control of card information with respect to the card issue system 5 and the public telephone sets $1_t$ to $1_n$, a display unit 32 for monitoring the valid period of an input card, a keyboard 33 for inputting the valid period of the card, a semiconductor memory (to be referred to as a memory hereinafter) 34 for allowing random access at a high speed, and a line interface 35 for performing line interface between a memory storing black list information in which the serial number of an illegal card is registered and the leased telephone line LN2 connected to the public telephone sets $1_t$ to $1_n$, as shown in FIG. 3. The hard disk 4 is also connected to the card validation system 3. The controller 31 receives card issue information including the issue date, the serial number, and the call rate of the card from the card issue system 5 through a modem or a LAN (Local Area Network). At the same time, the controller 31 transmits/receives the card information to/from the public telephone sets $1_t$ to $1_n$ through the line interface 35 and the switching system 2 via the leased line LN2.

Figure 4:
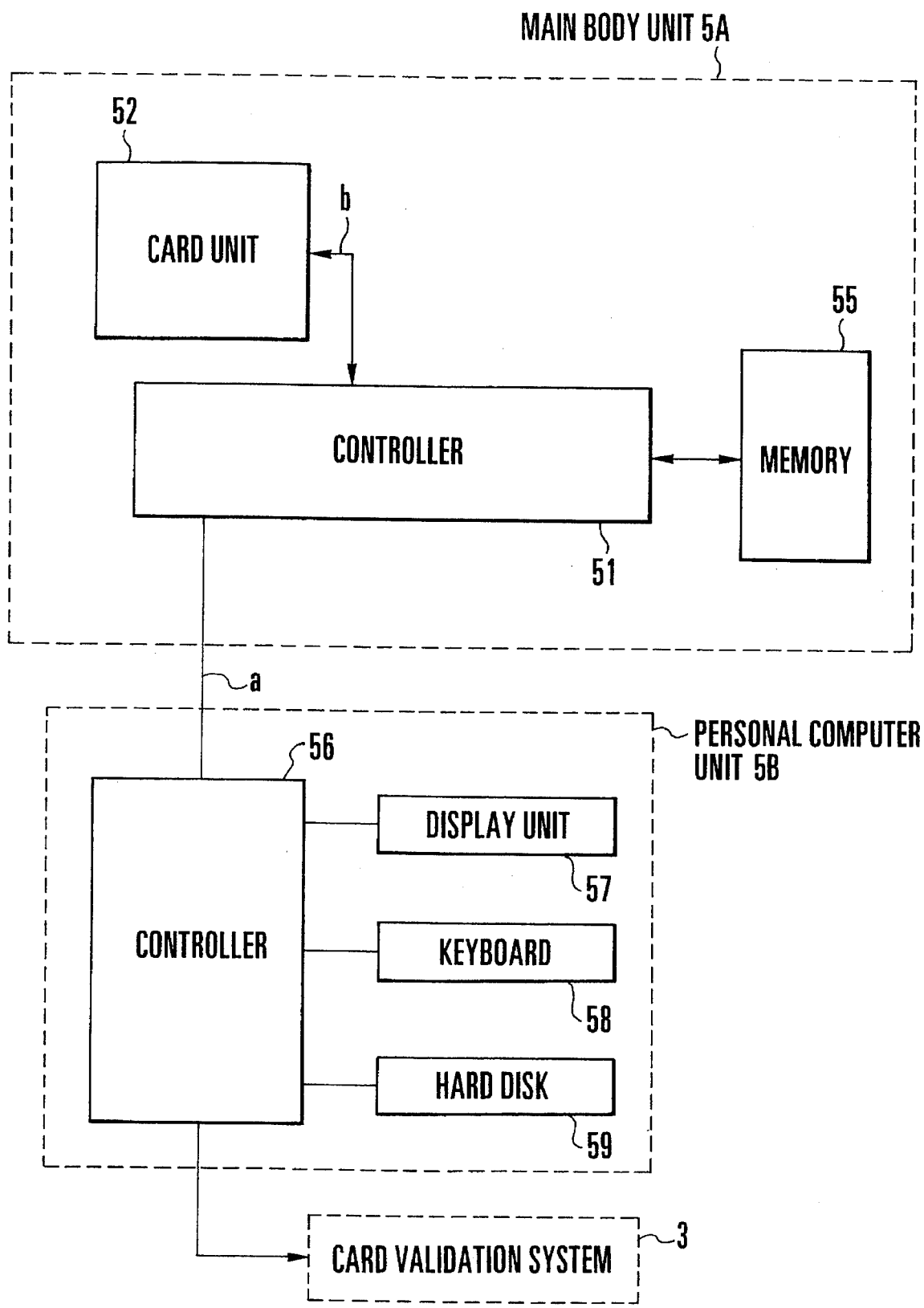
FIG. 4 is a block diagram showing a card issue system constituting the public telephone system shown in FIG. 1.

The card issue system 5 constituting the public telephone system has a main body unit 5A and a personal computer unit 5B for supplying a card issue command to the main body unit 5A, as shown in FIG. 4. Data between the main body unit 5A and the personal computer unit 5B is transmitted in the form of an RS (Recommended Standard)—232C signal a. The main body unit 5A is constituted by a controller 51 for performing card issue processing and transmission control of card issue information to the center apparatus 6, a card unit 52 for performing a card issue operation on the basis of control by the controller 51, and a memory 55 for storing the card issue information and the like. The personal computer unit 5B is constituted by a controller 56 for performing various processing control including transmission of a card issue command to the main body unit 5A, a display unit 57 for monitoring a processing control state, a keyboard 58 for inputting the card issue command, and a hard disk 59 for storing various data related to the card issue operation. The controller 56 transmits the card issue information to the center apparatus 6 through a modem or a LAN (neither are shown) when a new card is issued.

The main operation of the public telephone system having the above arrangement will be described below with reference to flow charts in FIGS. 5 and 6.

Figure 5:
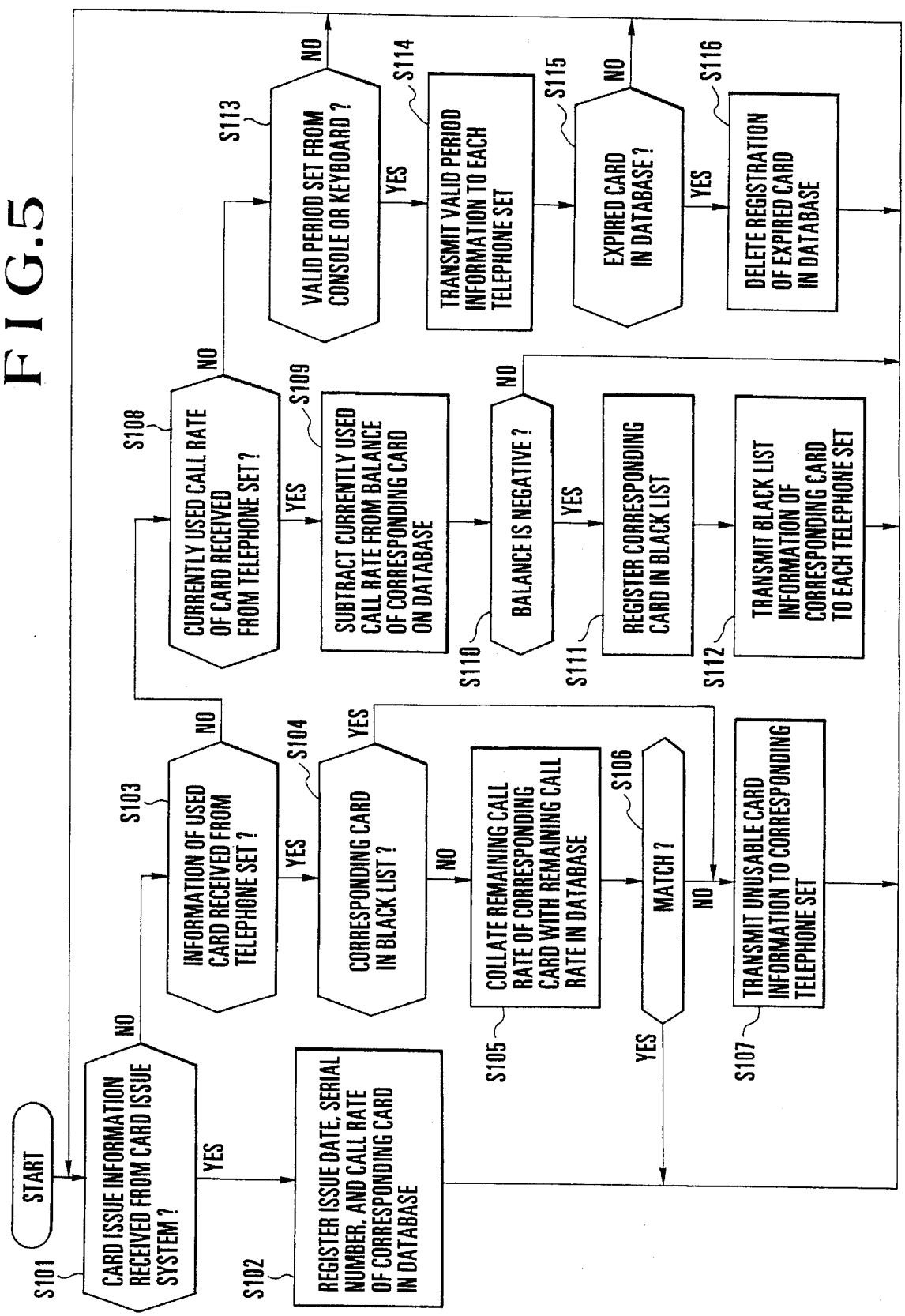
FIG. 5 is a flow chart showing the operation of the center apparatus shown in FIG. 3.
Figure 6:
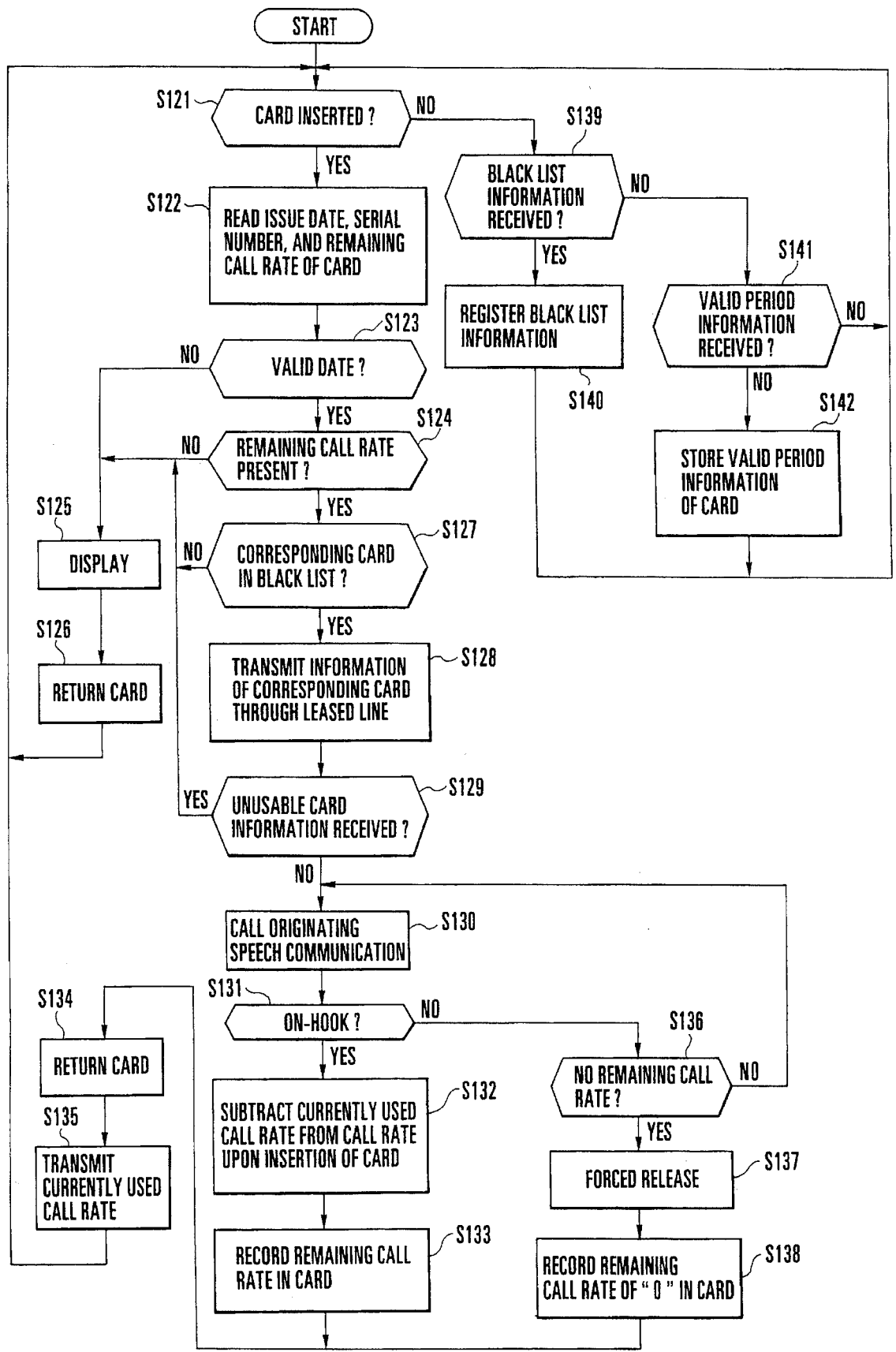
FIG. 6 is a flow chart showing the operation of the public telephone set shown in FIG. 2.

The operation of the center apparatus 6 constituting the public telephone system, which is shown in FIG. 5, i.e., the operation of the controller 31 of the card validation system 3 will be described. As described above, when a new card is issued by the card issue system 5, and the center apparatus 6 receives card issue information including the issue date, the serial number, and the call rate of the new card from the card issue system 5, it is determined to be "YES" in step S101. In step S102, of the received card information, the controller 31 registers the issue date, the serial number, and the call rate of the new card in the hard disk 4 constituting the database.

The newly issued card is registered in the hard disk 4 of the center apparatus 6 together with the card information, and the card information is used during speech communication in the public telephone set 1. In this case, the public telephone set 1 transmits the card information such as the serial number of the to-be-used card to the center apparatus 6 before speech communication. At this time, it is determined to be "YES" in step S103. In step S104, the controller 31 determines whether the serial number of the card is registered in a black list stored in the memory 34. Since the serial number of the new card is not registered in the black list, it is determined to be "NO" in step S104. However, if the card has been illegally used previously, its serial number is registered in the black list, so it is determined to be "YES" in step S104. In this case, in step S107, the controller 31 transmits unusable card information to the public telephone sets $1_t$ to $1_n$, to which the serial number of the illegal card is transmitted. As a result, speech communication using the illegal card in the public telephone sets $1_t$ to $1_n$ is inhibited.

If the card to be used in the public telephone sets $1_t$ to $1_n$ is not registered in the black list of the center apparatus 6, in step S105, the transmitted remaining call rate of the card is collated with the remaining call rate corresponding to the serial number of the card, which is stored in the database. If "NO" in step S106 because the two remaining call rates do not match with each other, unusable card information is transmitted to the public telephone sets $1_t$ to $1_n$ in step S107. At this time, the controller 31 for executing steps S105 and S106 constitutes a collating means, and the controller 31 for executing steps S104 and S107 constitutes the third determining means. If the unusable card information is not transmitted, speech communication in the public telephone sets $1_t$ to $1_n$ is allowed.

When speech communication is completed, and the currently used call rate information of the card is transmitted from the public telephone sets $1_t$ to $1_n$ together with the serial number of the card, it is determined to be "YES" in step S108. In this case, in step S109, the controller 31 subtracts the received currently used call rate from the remaining call rate of the card registered in the database. In step S110, it is determined whether the remaining call rate as the difference is negative. At this time, the controller 31 for executing steps S109 and S110 constitutes a detecting means for detecting an illegal card. If the difference is positive, the call rate is stored in the database. If the remaining call rate becomes "0", information related to the corresponding card is deleted from the database. If the remaining call rate is negative, in step S111, the serial number of this card is registered in the black list of the memory 34 because the card has been illegally used beyond the prepaid value. At the same time, in step S112, the serial number of the corresponding card and black list information representing that the card is registered in the black list are sequentially transmitted to the public telephone sets $1_t$ to $1_n$ managed by the center apparatus 6. These pieces of information are stored in the public telephone sets $1_t$ to $1_n$. As a result, the illegal card registered in the black list cannot be used in the public telephone sets $1_t$ to $1_n$ anymore.

When the valid period of a card, which is defined as a predetermined period after the issue date, is set in the center apparatus 6 by the operation of a console (not shown) or the keyboard 33, it is determined to be "YES" in step S113. In this case, in step S114, the controller 31 transmits valid period information to the public telephone sets $1_t$ to $1_n$. At this time, the valid period information of the card may be stored in the memory 34. In step S115, it is determined whether an expired card is present in the database constituted by the hard disk 4. If "YES" in step S115, the information of the expired card is deleted from the database in step S116. At this time, the controller 31 for executing steps S115 and S116 constitutes a deleting means.

The operation of the controller 20 of the public telephone sets $1_t$ to $1_n$, which responds to the above operation of the center apparatus 3, will be described below on the basis of a flow chart in FIG. 6.

When a card is inserted, and it is determined to be "YES" in step S121, the issue date, the serial number, and the remaining call rate of the inserted card are read in step S122. In step S123, it is determined, on the basis of the current date counted by the timepiece unit 21, whether the readout card issue date is within the valid issue period based on the valid period information which is transmitted from the center apparatus 3 and stored in the memory 22 in advance. At this time, the controller 20 for executing step S123 constitutes the first determining means. If "NO" in step S123, the display unit 24 displays information representing that the card is expired in step S125, and the card is returned in step S126. If "YES" in step S123, it is determined that the card is valid. The flow advances to step S124 to determine whether a remaining call rate is present. If "NO" in step S124, the display unit 24 displays information representing the remaining call rate is zero in step S125, and the card is returned in step S126.

If the card is in the valid period, and the remaining call rate is present, in step S127, the memory is accessed to determine whether the serial number of the card is registered in the black list. At this time, the controller 20 for executing step S127 constitutes the second determining means. If "YES" in step S127, the display unit 24 displays information representing that the card is illegal in step S125, and the card is returned in step S126. If "NO" in step S127, the card is determined to be legal and usable for speech communication. In step S128, the center apparatus 6 is called through the leased line LN2. When the center apparatus 6 responds to the call, card information including the serial number, the issue date, and the remaining call rate of the card is transmitted from the modem unit 23.

The controller 20 waits a response to the transmitted card information from the center apparatus. More specifically, in step S129, it is determined whether unusable card information is returned from the center apparatus 6 through the leased line LN2. If the unusable card information is received, information representing that the card is unusable is displayed in step S125, and the card is returned in step S126. If the unusable card information is not received within a predetermined period of time, a dial call originating operation is allowed, and the display unit 24 displays the remaining call rate. In step S130, call originating speech communication processing is performed through the public line LN1 on the basis of the call originating speech communication operation of the user. During speech communication, a charge signal is detected by the charge signal detector circuit 12 to decrease the call rate of the card.

During call originating speech communication, in step S131, the controller 20 determines completion of speech communication by the hook switch HS2. If an on-hook operation is detected, the call rate used for this speech communication is subtracted from the call rate read upon insertion of the card in step S132, and the remaining call rate is recorded in the card in step S133. The card is returned in step S134. At the same time, in step S135, the center apparatus 6 is called through the leased line LN2 again, and the call rate used for the speech communication is transmitted to the center apparatus 6. As a result, the center apparatus 6 subtracts the received currently used call rate from the call rate of the card, which is registered in the database constituted by the hard disk 4. At the same time, if the subtraction result becomes negative, the card is determined to be illegal, and its serial number is registered in the black list of the memory 34.

If the remaining call rate becomes zero during call originating speech communication, and it is determined to be "YES" in step S136, the DC loop of the public line LN1 is forcibly released in step S137. In step S138, the remaining call rate of "0" is recorded in the card. As in completion of speech communication by an on-hook operation, the card is returned in step S134, and the call rate used for this speech communication is transmitted to the center apparatus 6 in step S135.

If black list information is received from the center apparatus 6 in response to the call to the leased line LN2, it is determined to be "YES" in step S139. In this case, in step S140, the controller 20 registers the received black list information in the memory 22. This black list information is used to determine an illegal card in step S127. If the black list information represents the serial numbers of all illegal data, all the black lists in the memory 22 can be updated. If the black list information represents the serial number of a new illegal card, the serial number of the new illegal card can be additionally registered in the black list in the memory 22.

If the valid period information of the card is received from the center apparatus 6, it is determined to be "YES" in step S141. In this case, the controller 20 stores the valid period of the card in the memory 22. This valid period information is used to determine the validity/invalidity of the card issue date in step S123.

As described above, the issue date is stored in the card. At the same time, the valid period of the card is set, and only card information within the valid period is stored in the database of the center apparatus 6. For this reason, the capacity of the database can be determined, and the capacity can also be minimized. Therefore, retrieval of the corresponding card can be performed in a short period of time.

The valid period of the card is checked on only the public telephone sets $1_1$ to $1_n$ side. However, the presence/absence of registration in the black list information is checked not only on the public telephone sets $1_1$ to $1_n$ side but also on the center apparatus 6 side. This is because a time lag is generated between registration of an illegal card in the black list of the memory 34 of the center apparatus 6 and completion of transmission of the black list information to the public telephone sets $1_1$ to $1_n$.

The remaining call rate of an expired card is exchanged for cash or a new card in a predetermined agency and returned to the user. Therefore, the user will not suffer any disadvantage.

In the above embodiment, the memory 22 for storing the valid period information of a card and black list information corresponds to the first and second memory means. However, two memories may independently store these pieces of information, as a matter of course. In addition, in the center apparatus 6, all card information is stored in the hard disk 4. However, the card information of a card likely to be used, e.g., a card which has been issued one year ago or less may be stored in the semiconductor memory 34 serving as the third memory means. In this case, the access time to the card information can be shortened as compared to the hard disk 4. Furthermore, the black list information is stored in the semiconductor memory 34. However, if the access time need not be short, the black list information may be stored in the hard disk 4 constituting the database, together with the card information of each card.

As has been described above, according to the present invention, card issue information including the issue date of each card is stored in the database of the center apparatus. At the same time, the card information of an expired card is deleted in the database. For this reason, the necessary capacity of the database can be easily determined in accordance with, e.g., the number of cards which are issued within the valid period of the cards. At the same time, since the capacity of the database can be minimized, the time necessary for retrieval of a corresponding card can be shortened. In addition, if an expired card is inserted at the time of use of a card in a public telephone set, the readout card information is not transmitted to the center apparatus. Therefore, retrieval of the expired card in the center apparatus is inhibited, so unnecessary collation and retrieval in the center apparatus can be prevented. Furthermore, if the card is an expired card, a predetermined message is displayed before the card is returned. For this reason, the card user can immediately recognize the reason why the card is unusable.

What is claimed is:

1. A public telephone system comprising:

a plurality of public telephone sets for allowing speech communication upon insertion of a prepaid card, said prepaid card storing card information including an indentification number, value information, and an issue date; and a center apparatus for determining whether speech communication is possible upon reception of information from said public telephone sets through a telephone line before start of speech communication by said prepaid card, each of said public telephone sets comprising reading means for reading the card information recorded in said prepaid card upon insertion of said prepaid card, and first transmitting means for transmitting the card information read by said reading means to said center apparatus through said telephone line, and said center apparatus comprising a database for storing the card information of said prepaid card, collating means for collating the card information stored in said database with the card information from said first transmitting means upon insertion of said prepaid card into each public telephone set and allowing speech communication using said prepaid card on the basis of a collation result, setting means for setting data for designating a valid period of said prepaid card from the issue date, and deleting means for deleting the card information related to said prepaid card which is expired in said database based on the date for designating the valid period of said card set by said setting means.

2. A system according to claim 1, wherein the data for designating the valid period of said prepaid card, which is set by said setting means, is data representing a valid period with reference to the issue date of said prepaid card.

3. A system according to claim 2, wherein said center apparatus comprises second transmitting means for sequentially transmitting the valid period of said prepaid card, which is set by said setting means, to said public telephone sets through said telephone line, and each of said public telephone sets comprises first memory means for storing the valid period of said prepaid card from said second transmitting means and first determining means for determining whether speech communication using said prepaid card is possible on the basis of the issue date in the card information read by said reading means upon insertion of said prepaid card and the valid period of said prepaid card, which is stored in said first memory means.

4. A system according to claim 3, wherein said public telephone set comprises calendar timepiece means for counting a date, and said first determining means calculates a valid issue period from a current date counted by said calendar timepiece means and the valid period of said prepaid card, which is read from said first memory means and at the same time activates said first transmitting means when the issue date read from said prepaid card is within the valid issue period.

5. A system according to claim 3, wherein said public telephone set comprises display means for displaying expiration of said prepaid card when said first determining means determines that speech communication is impossible and returning means for returning said expired prepaid card.

6. A system according to claim 1, further comprising a card issue system for issuing said prepaid card and at the same time transmitting card issue information including the identification number, a call rate, and the issue date of said prepaid card to said center apparatus, and wherein said center apparatus receives the card issue information of said prepaid card from said card issue system and stores the information in said database as the card information.

7. A system according to claim 1, wherein said center apparatus comprises third transmitting means for transmitting black list information in which the identification number of said prepaid card which is recognized to be illegal is registered in said public telephone sets, and each of said public telephone sets comprises second memory means for storing the black list information from said third transmitting means and second determining means for determining whether speech communication using said prepaid card is possible on the basis of the presence or absence of registration of the identification number in the black list information stored in said second memory means, the identification number being read by said reading means upon insertion of said prepaid card.

8. A system according to claim 7, wherein said center apparatus comprises detecting means for detecting that said prepaid card is an illegal card on the basis of a call rate of said prepaid card, which is stored in said database, and a call rate used for speech communication, which is transmitted from said public telephone set, upon completion of speech communication, to activate said third transmitting means, third memory means for storing the identification number of said prepaid card as a black list, said prepaid card being detected by said detecting means as an illegal card, and third determining means for determining whether speech communication using said prepaid card is possible on the basis of the presence or absence of registration of the identification number of said card from said public telephone set in said third memory and transmitting a determination result to said public telephone set.

9. A system according to claim 8, wherein the card information from said public telephone set to said center apparatus, the black list information from said center apparatus to said public telephone set, and the determination result from said third determining means are transmitted through a leased line.

* * * * *